Figure 1:
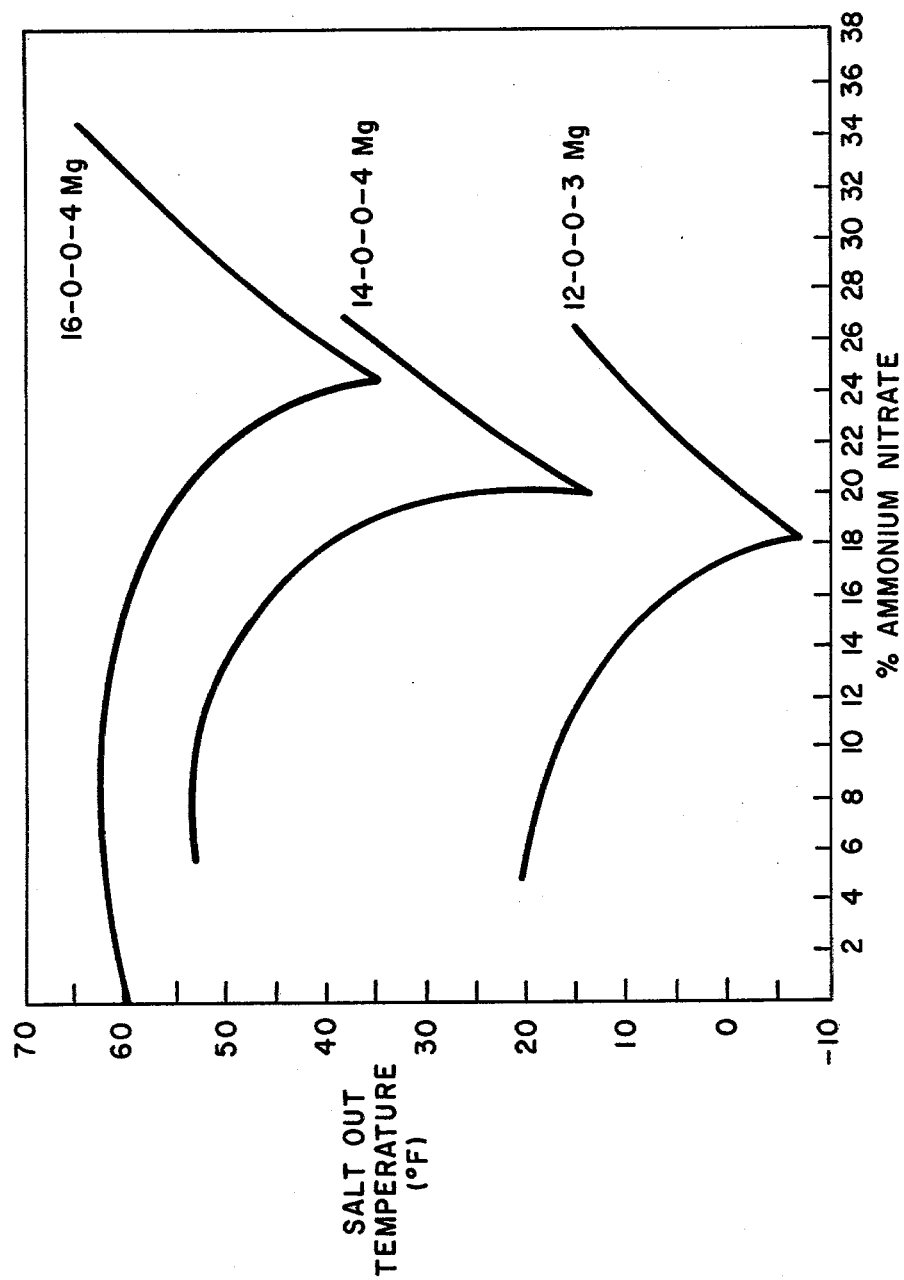

United States Patent [19]

Hawkins et al.

[11] 4,191,550
[45] Mar. 4, 1980

[54] STORAGE-STABLE NITROGEN-MAGNESIUM FOLIAR SPRAY COMPOSITIONS

[75] Inventors: Edwin F. Hawkins; Thomas M. Parham, Jr., both of Baton Rouge, La.

[73] Assignee: Allied Chemical Corporation, Morris Township, Morris County, N.J.

[21] Appl. No.: 907,651

[22] Filed: May 22, 1978

[51] Int. Cl.² .............................................. C05C 9/00
[52] U.S. Cl. ........................................... 71/30; 71/28
[58] Field of Search ................. 71/1, 28, 29, 30, 64 C, 71/59

[56] References Cited

U.S. PATENT DOCUMENTS

| | | | |
|---|---|---|---|
| 2,022,672 | 12/1935 | Kniskern | 71/29 |
| 2,549,430 | 4/1951 | Crittenden | 71/30 |
| 2,855,286 | 10/1958 | Harvey | 71/28 |
| 3,440,034 | 4/1969 | Fuller | 71/30 |
| 3,930,832 | 1/1976 | Sansing, Jr. et al. | 71/30 |
| 4,025,330 | 5/1977 | Storey | 71/30 |
| 4,033,747 | 7/1977 | Young | 71/28 |

FOREIGN PATENT DOCUMENTS

| | | | |
|---|---|---|---|
| 705844 | 3/1965 | Canada | 71/28 |
| 2730919 | 1/1978 | Fed. Rep. of Germany | 71/30 |

OTHER PUBLICATIONS

*Liquid Fertilizer Manual*, National Fertilizer Association, 1967, Illinois, pp. 18i, 18-1, 18-7, 18-10, 18-8, 18-9.

*Fertilizer Technology and Usage*, McVickar, Malcolm H., et al., Soil Science Society of America, Wisconsin, 1963, pp. 308–309.

*Primary Examiner*—Joseph Scovronek
*Assistant Examiner*—Chris P. Konkol
*Attorney, Agent, or Firm*—Michael S. Jarosz

[57] ABSTRACT

Storage-stable fertilizer compositions exhibiting exceptionally low salt-out temperatures comprising aqueous solutions of magnesium nitrate, ammonium nitrate and urea, present in particular proportions, are provided.

6 Claims, 2 Drawing Figures

STORAGE-STABLE NITROGEN-MAGNESIUM FOLIAR SPRAY COMPOSITIONS

BACKGROUND OF THE INVENTION

1. Field of the Invention

This invention is directed to the production of storage-stable fertilizer concentrate compositions containing magnesium nitrate and certain plant food nitrogen in aqueous solution, present in particular proportions, as well as to aqueous foliar spray for application on various crops. More particularly, the present invention is concerned with compositions exhibiting improved low salt-out temperatures comprised of eutectic compositions of critical proportions of magnesium nitrate, ammonium nitrate and urea in aqueous solution.

2. Description of the Prior Art

The use of magnesium in various forms as soil fertilizer has been known for many years. Magnesium occurs native as the mineral magnesite (Mg $CO_3$), widely as dolomite ($MgCO_3.CaCO_3$), also as the sulfate ($MgSO_4$) and as the sulfate of potash-magnesia (Mg $SO_4.K_2SO_4$). Several forms of magnesia (MgO) are used in the manufacture of fertilizers, especially for potatoes, fruit trees, and tobacco. This product made by calcining magnesite is called calcined magnesite and the product prepared from seawater is called seawater magnesia.

Mixed fertilizers containing plant nutrients such as nitrogen, potassium, phosphorus, calcium and sulfur, in addition to magnesium, are also known in the art. U.S. Pat. No. 1,916,617 issued July 4, 1933 discloses the obtainment of mixed fertilizers containing potash and nitrogen from the nitrates of calcium or magnesium or mixtures of both.

Liquid magnesium-containing fertilizers are also known and have more recently been described in Agrochemia, 1976, 16 (12) pages 344–48 and in Czech Pat. Nos. 145,487 and 165,530, issued Oct. 15, 1976.

The application of nitrogen in the form of urea, or other source of nitrogen, to foliage has also been described in U.S. Pat. No. 2,802,307 issued Aug. 13, 1957, as well as in U.S. Pat. No. 2,663,629, issued Dec. 22, 1953. The application of mixed fertilizers to forested areas including nitrogeneous fertilizers, such as mixtures of urea and ammonium nitrate, together with nominal amounts of mineral supplements, such as salts of magnesium, have more recently been described in U.S. Pat. Nos. 4,033,747 and 4,033,746, issued July 5, 1977. U.S. Pat. No. 4,035,173, issued July 12, 1977, also is concerned with a method for simultaneously fertilizing living commercial timber forests using a combination of nitrogeneous fertilizer solutions of particular dosage.

U.S. application Ser. No. 704,269, of Clapp, Parham Jr., and Johnson filed July 12, 1976, now abandoned, and assigned to the same assignee as in the present application, discloses the use of an aqueous solution of magnesium nitrate, ammonium nitrate and urea on crops as a foliar fertilizer, even when the crops are grown in soils that are very high in soil magnesium. U.S. Pat. No. 3,930,832, issued Jan. 6, 1976, also assigned to the same assignee as in the present application, discloses the inhibition of corrosion of carbon steel by aqueous solutions of zinc nitrate, ammonium nitrate and urea by incorporating therein of an effective amount of a thiosulfate compound. As is apparent from U.S. application, Ser. No. 704,269, the urea and ammonium nitrate ingredients of the magnesium nitrate-containing compositions disclosed therein are incorporated in the composition in the form of a commercial fertilizer solution and hence, these compositions contain on a weight basis, at least about 14%, by weight, of urea, and generally, at least about 20%, by weight, of urea. Furthermore, the commercial magnesium nitrate-ammonium nitrate-urea solution of the aforementioned Application, presently sold as a 16-0-0-4 Mg solution, is characterized by having an ammonium nitrate to urea ratio of about 1.3 to 1, and hence, precipitates solid material, i.e. "salts-out," during storage, transportation or field application at temperatures of about 60° F. It has been found, further, that the lowest possible salt-out temperature for a nitrogen-magnesium formulation containing 16% nitrogen from the commercial fertilizer solution of ammonium nitrate and urea, referred to in said application and 4% magnesium from magnesium nitrate is about 35° F., a temperature which is too high for safe storage and transport in most geographical locations, unless expensive temperature controlled equipment is employed, if available; furthermore, the precipitated solids cannot be conveniently pumped or otherwise handled by apparatus normally used for such solutions. Accordingly, need exists for magnesium nitrate-ammonium nitrate-urea aqueous fertilizer solutions having low salt-out temperatures which are capable of being transported, stored and handled as a liquid concentrate, as well as a sprayable solution.

SUMMARY OF THE INVENTION

The present invention provides certain novel magnesium nitrate-containing concentrates and foliar spray fertilizer compositions of high agronomic value which are stable and exhibit desirably low salt-out temperatures. The compositions of the present invention, which will remain substantially clear solutions indefinitely at about 68° F. and will not precipitate solid material, i.e. salt-out, at temperatures above about 30° F., and preferably above about 18° F., comprise a solution consisting essentially of about 18% to 28%, preferably between about 23% and 26% by weight, of magnesium nitrate solute, about 13% to 32%, preferably between about 18% and 25%, by weight, of ammonium nitrate solute, and about 3.5% to 8%, preferably between about 4% and 7%, by weight, of the composition, of urea solute, the balance being water. In accordance with the present invention, it is essential that the ammonium nitrate to urea weight ratio be maintained between about 3.5:1 and 5:1, preferably between about 3.9:1 and 4.5:1, and that the nitrogen to magnesium weight ratio be maintained between about 1.5:1 and 5:1, preferably 3.2:1 and 3.8:1, in order to obtain the desirable salt-out temperatures of the compositions. The undesirable salt-out characteristics of compositions of magnesium nitrate, ammonium nitrate and urea compositions, heretofore prepared, it was found in accordance with the present invention, are attributed to the excess quantities of urea which necessarily were present in such compositions due to the use of a commercial mixture of ammonium nitrate and urea. Unexpectedly, it was found that substitution of increased quantities of ammonium nitrate for decreased quantities of urea in these magnesium nitrate-containing compositions result in novel eutectic compositions. In addition, it has been found that the eutectic compositions also have enhanced solubilities for ammonium nitrate at substantially identical magnesium concentrations. This improved solubility is significant in that it permits the transportation and storage of a high concentration of the liquid nutrients of the present invention to the site of application for any given salt-out temperature.

Figure 2:
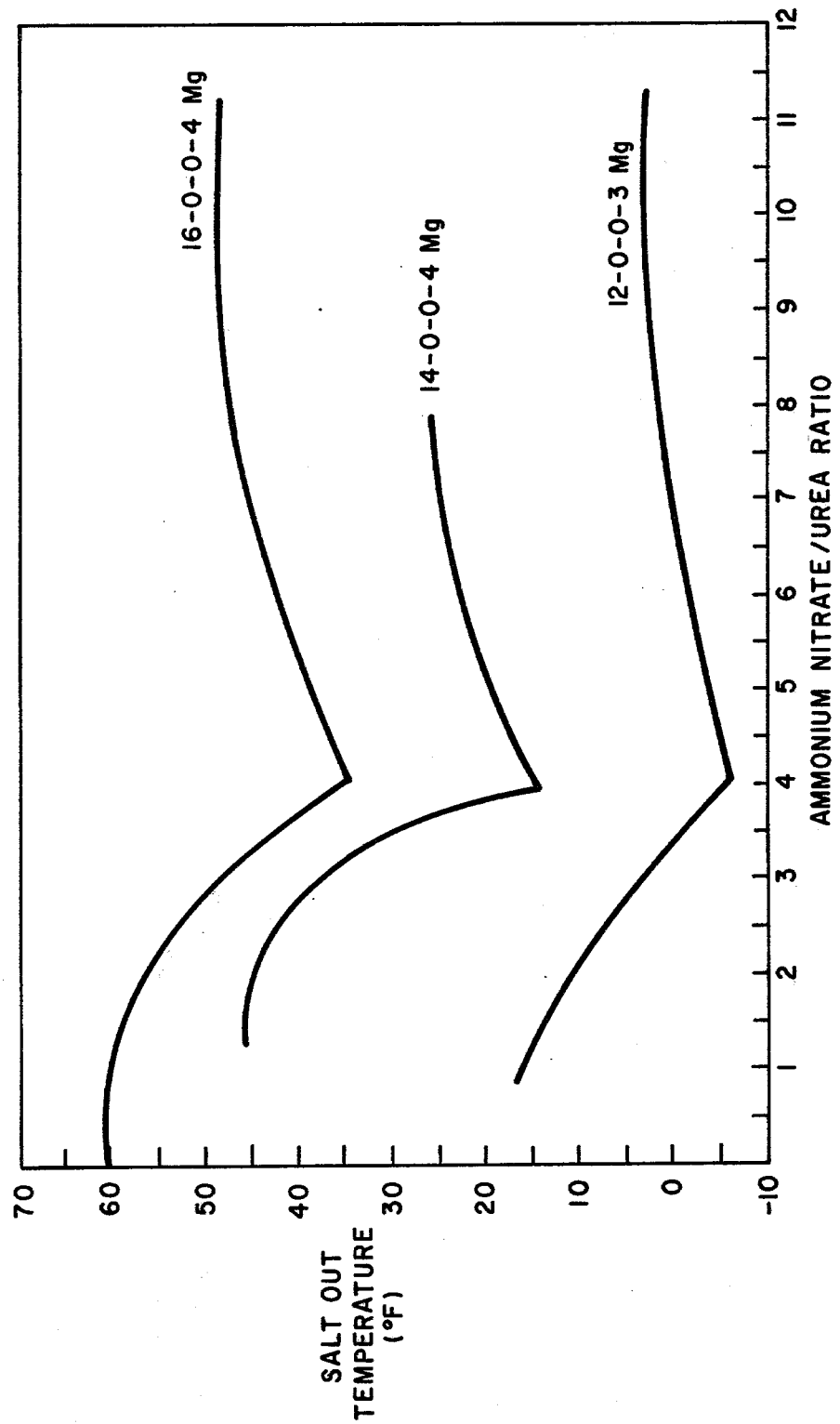

The composition of this invention may be illustrated by reference to the FIGURES representing typical fertilizer solutions of this invention as compared with known commercially available fertilizer solutions:

FIG. 1 is a diagram plotting salt-out temperature vs. ammonium nitrate concentration; and FIG. 2 is a diagram plotting salt-out temperature vs. ammonium nitrate/urea ratios.

Referring to the figures, it can be seen that the magnesium nitrate-ammonium nitrate-urea and water compositions, in accordance with the proportions of the present invention, form eutectic compositions having greatly enhanced solubilities for ammonium nitrate at substantially identical magnesium concentrations. As illustrated, the salt-out temperature of a 16-0-0-4 Mg composition consisting essentially of about 16.1% ammonium nitrate, 12.4% urea, 24.4% magnesium nitrate and 47.1% water is not less than about 35° F. In contradistinction, typical compositions of the invention exhibit substantially lower salt-out temperatures, hence, a 14-0-0-4 Mg composition, consisting essentially of 20.6% ammonium nitrate, 4.6% urea, 24.6% magnesium nitrate, and 50.2% of water, is characterized by a salt-out temperature of approximately 18° F. and a 12-0-0-3 Mg composition consisting essentially of 18.8% ammonium nitrate, 4.2% urea, 18.3% magnesium nitrate and 58.7% water exhibits a salt-out temperature below −5° F. FIG. 2 demonstrates the criticality of the ammonium nitrate to urea ratios; as is evident therefrom, the salt-out temperature increases at ratios of ammonium nitrate to urea substantially outside the ranges specified.

Fertilizer compositions falling within the scope of this invention therefore comprise those fertilizer compositions having salt-out temperatures no greater than about 30° F., and preferably, no greater than 20° F., comprise aqueous solutions of magnesium nitrate, ammonium nitrate and urea having ammonium nitrate/urea ratios between about 3.5 to 5:1, and preferably, 3.9 to 4.5:1. Any departure from these ratios results in unsatisfactory salt-out temperatures for solutions of these fertilizer combinations.

The compositions of the present invention are obtained in conventional manner by simple admixture of magnesium nitrate in an aqueous solution with ammonium nitrate and urea; the ammonium nitrate and urea components may be incorporated in solid or liquid form. The magnesium nitrate is normally admixed as an aqueous solution with the urea and ammonium nitrate components in liquid form. The resultant liquid compositions, formed by admixture of the ingredients thereof, in general, exhibit a pH ranging from about 3 to about 10. The compositions of the present invention are further characterized by a pH of between about 4 and 7, preferably between about 5 and 7, and especially between about 5.8 and 6.2. Accordingly, in the event the pH of the resultant admixture of the aqueous magnesium nitrate, ammonium nitrate and urea composition is below about 3, sufficient ammonia may be added, in conventional manner, to the solution to adjust the pH to the desired range and, in the event the resultant admixture exhibits a pH above 10, the pH may be lowered, in conventional manner, by the incorporation of sufficient quantities of a mineral acid, such as nitric acid, sulfuric acid or phosphoric acid, or an organic acid such as alkanoic acid, illustratively acetic acid, to adjust the pH to the desired range.

Since liquid compositions containing magnesium salts and/or liquid nitrogen fertilizers are known to be corrosive to steel equipment used in the storage, transportation and application thereof, a corrosion inhibitor is advantageously incorporated in these compositions in an effective amount to inhibit such corrosion. In general, the incorporation of a water-soluble thiosulfate compound, such as ammonium thiosulfate, sodium thiosulfate or potassium thiosulfate in an amount between 0.1% and 5%, preferably between about 0.1 and 0.5%, by weight of the composition, satsifactorily provides protection for carbon steel without deleterious effect on the stability or salt-out temperatures of the compositions of this invention.

The compositions of the present invention are produced as a concentrate, and hence, are readily adapted for handling, transport and storage, as such; although such concentrates are employable directly as fertilizers suitable for soil application as well as foliar spray fertilizers, these concentrates are normally further diluted with an additional quantity of water, generally up to about 1,000 parts, by weight, per part of the composition for most applications as a foliar spray. Hence, the compositions of the present invention contain, as essential ingredients, water, magnesium nitrate, ammonium nitrate, urea, and desirably a corrosion inhibitor, such as a thiosulfate compound, in the concentrations and in the proportions above specified. The composition of the present invention may additionally contain minor amounts, illustratively, up to about 100 parts per million of a dye to provide for distinctive color identification, as well as other adjuvants conventionally employed in the preparation and application of liquid fertilizer compositions provided that these adjudvants, either as a result of the concentration employed or by their nature, are not deleterious to the fertilizer compositions of the invention or adversely affect their salt-out temperatures. The compositions of the present invention are further characterized as being substantially free of magnesium or nitrogen containing precipitates, and hence, are storage-stable over extended periods at ambient temperatures.

The compositions of the invention may be employed in foliar application, be applied through irrigation water or incorporated in liquid starter fertilizers and applied as such directly to the fertilizer soil. In foliage application, the compositions are generally employed in proportions ranging from about 1 gallon of the aforesaid concentrate to from about 3 to about 1,000 gallons of water, depending upon the crop to which the fertilizer composition is applied; a typical composition of the invention, present as a 14-0-0-4 Mg solution is applied, in general, in an amount of between about 0.1 to 1 gallon of concentrate per 100 gallons of water when applied to fruit trees such as apple, peach and citrus, as well as to nut trees, including walnuts and pecan. Similar concentrations and higher, up to about 5 gallons of concentrate per 100 gallons of water may be applied to row crops and field crops including beans, tomatoes, sugar beets, rice, peppers, potatoes, soybeans, corn and tobacco. When applied through irrigation water or as a soil fertilizer, the compositions are employable in conventional manner in amounts of about 0.05 gallons to 10 gallons of concentrate in a suitable quantity of water per acre. The actual volume of composition employed in any application can be varied depending upon the density of the foliage and amount of magnesium desired to be incorporated into the magnesium-deficient plants and/or soil. The fertilizer composition of the invention, may, if desired, be applied annually, although more frequent application such as semi-annually, or quarterly, may be used, or alternatively, these applications can be less frequent, for example, bi-annually.

The compositions of the present invention may likewise have incorporated therein minor amounts, for example, from about 0.1 to 2 weight percent of a surfactant not deleterious to the compositions which aids in the spreading of the solutions on the foliage to achieve an even coverage and also assists in absorption of the fertilizer into the foliage; examples of suitable surfactants and cationic, anionic, and non-ionic types, as well as mixtures thereof, which are well known in the art. In addition, various pesticides can be incorporated with the compositions of the invention to obtain combined fertilization-pesticidal treatment; pesticides so incorporated include the herbicides having selected action for undesired vegatation, or insecticides, larvicides, miticides, and the like, all of which are well known to those skilled in the art and employable in accordance with conventional practice.

In order to demonstrate the invention, the following example is given. All parts and percentages are by weight, unless otherwise indicated.

EXAMPLE 1

A foliar spray composition is prepared by admixing an aqueous solution of magnesium nitrate (solution A) with an aqueous solution of urea and ammonium nitrate (solution B). About 0.1 to 1% of a water-soluble thiosulfate compound such as ammonium thiosulfate, sodium thiosulfate or potassium thiosulfate is added as a corrosion inhibitor. Further about 0.001 to 0.005% of a water-soluble dye may be added to impart a characteristic color. The mixture is diluted with up to 1000 parts of water. Desirably, a relatively concentrated fertilizer solution is prepared for shipment, which solution is diluted with water prior to use as a foliar spray. A typical 14-0-0-4 Mg concentrate solution may be prepared by mixing the following to obtain one ton of product:
1270 pounds of solution A
726 pounds of solution B
5 pounds of ammonium thiosulfate,
60% aqueous solution.
The resulting solution, to which is added with mixing about 0.04 pounds of a water-soluble dye to impart characteristic color, contains about 4% magnesium and about 14% total nitrogen. It is further characterized by having a pH of about 5.8 to 6.2; a specific gravity (60° F./60° F.) of about 1.345 and a salt-out temperature of about 18° F.

Solution A is an aqueous solution of magnesium nitrate which for the product illustrated as typical contains 6.3% magnesium and is available commercially or may be conveniently prepared by, among other means, stoichiometric reaction of nitric acid with magnesium oxide, magnesium carbonate or magnesium metal along with such water as is necessary to achieve the desired final dilution.

Solution B for the typically illustrated product is an aqueous solution comprised of ammonium nitrate (about 57.3 the percentage mark), urea (about 12.7%), and the balance of water such that the total nitrogen content of said solution is about 26%.

Ammonium thiosulfate, 60% aqueous solution, and suitable water-soluble dyes are items of commerce.

We claim:

1. A composition comprising a storage-stable fertilizer concentrate solution of a pH of between about 4 and 7 consisting essentially of water, about 18% to 28%, by weight, of magnesium nitrate solute, about 14% to 32% by weight, of ammonium nitrate solute, and about 3.5% to 8%, by weight, of urea, said composition having an ammonium nitrate to urea weight ratio of between about 3.5:1 and 5:1 and a nitrogen to magnesium weight ratio of between about 1.5:1 and 5:1 and a salt-out temperature below about 30° F.

2. The composition of claim 1 additionally containing a water-soluble thiosulfate compound in an amount sufficient to inhibit corrosion to carbon steel.

3. The composition of claim 1 wherein the magnesium nitrate is present in an amount between about 23% and 26%, by weight, the ammonium nitrate is present in an amount between about 18% and 25%, by weight, the urea is present in an amount between about 4% and 7%, by weight, of the composition, and the pH of the fertilizer solution is between about 5 and 6.5 and a salt-out temperature below about 20° F.

4. The composition of claim 3, additionally containing between about 0.1% to 5%, by weight, of a water-soluble thiosulfate compound selected from the group consisting of ammonium thiosulfate, sodium thiosulfate and potassium thiosulfate.

5. The composition of claim 1 wherein the magnesium nitrate is present in an amount between 24% and 25%, by weight, the ammonium nitrate is present in an amount between 18% and 23%, by weight, and the urea is present in an amount between 4 and 5%, by weight, of the composition, and the pH of the fertilizer solution is between about 5.8 and 6.2, said composition being characterized by having a salt-out temperature below 18° F.

6. The composition of claim 5 additionally containing a water-soluble thiosulfate selected from the group consisting of ammonium thiosulfate, sodium thiosulfate and potassium sulfate, present in an amount between about 0.1 and 0.5%, by weight, of the composition.

* * * * *

UNITED STATES PATENT AND TRADEMARK OFFICE
CERTIFICATE OF CORRECTION

PATENT NO. : 4,191,550

DATED : March 4, 1980

INVENTOR(S) : Hawkins et al.

It is certified that error appears in the above-identified patent and that said Letters Patent are hereby corrected as shown below:

Col. 2, line 9; " "salts-out," " should read --"salts-out",--.

Col. 4, line 36: "adjudvants" should read --adjuvants--.

Col. 5, line 15: "tants and cationic" should read --tants are cationic--.

Col. 5, line 21: "vegatation" should read --vegetation--.

Col. 6, line 11: "57.3 the percentage mark)" should read

--57.3%)--.

Col. 6, line 54: "sulfate" should read --thiosulfate--.

Signed and Sealed this

Fifteenth Day of July 1980

[SEAL]

Attest:

SIDNEY A. DIAMOND

Attesting Officer    Commissioner of Patents and Trademarks